United States Patent
Kusaka

(10) Patent No.: US 7,254,322 B2
(45) Date of Patent: Aug. 7, 2007

(54) DRIVE CONTROLLER OF A LENS APPARATUS

(75) Inventor: Yusuke Kusaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 11/103,051

(22) Filed: Apr. 11, 2005

(65) Prior Publication Data

US 2005/0244153 A1    Nov. 3, 2005

(30) Foreign Application Priority Data

Apr. 28, 2004  (JP) .............................. 2004-132431

(51) Int. Cl.
*G03B 13/36* (2006.01)
*G02B 15/14* (2006.01)

(52) U.S. Cl. ........................ 396/79; 348/347; 359/698; 396/131; 396/137

(58) Field of Classification Search ............ 396/79–83, 396/131, 137; 348/347; 359/698
See application file for complete search history.

(56) References Cited

U.S. PATENT DOCUMENTS

| | | | |
|---|---|---|---|
| 4,609,260 A | 9/1986 | Kawai | |
| 5,075,713 A * | 12/1991 | Sakata | 396/80 |
| 5,420,721 A | 5/1995 | Kanno | |
| 6,847,495 B2 * | 1/2005 | Nurishi | 359/698 |
| 7,099,089 B2 * | 8/2006 | Yakita et al. | 359/698 |
| 2002/0127012 A1 | 9/2002 | Okawara | |

FOREIGN PATENT DOCUMENTS

| | | |
|---|---|---|
| EP | 1396746 | 3/2004 |
| JP | 62-247316 A | 10/1987 |

* cited by examiner

*Primary Examiner*—W. B. Perkey
(74) *Attorney, Agent, or Firm*—Canon U.S.A., Inc., IP Division

(57) ABSTRACT

A drive controller of a lens apparatus including a first lens unit moving for performing manual focus and a second lens unit moving for performing auto-focus has a control device switchable between a first mode for performing an auto-focus control of the second lens unit and a second mode for making the second lens unit unmovable at a predetermined position. The control device has a third mode for controlling drive of the second lens unit, upon receiving a command for switching from the first mode to the second mode, so as to maintain a focus state of the lens apparatus, on the basis of positional information of the first lens unit. The controller moves to the second mode upon detecting that the second lens unit has reached the predetermined position in the third mode.

34 Claims, 7 Drawing Sheets

DRIVE CONTROLLER OF A LENS APPARATUS

BACKGROUND OF THE INVENTION

1. Field of the Invention

The present invention relates to a drive controller of a lens apparatus performing manual focus (MF) and auto-focus (AF) by moving different lens units from each other.

2. Description of the Related Art

Many lens systems of a rear focus type, in which a focus lens unit is arranged closer to an image than a variable lens unit, are incorporated in zoom lenses of an auto-focus type since such a lens system offers an advantage of reducing the size and weight of the focus lens unit and quickly achieving focusing.

Whereas, many lens systems of a front cell focus type, in which the focus lens unit is arranged closer to an object than the variable lens unit, are incorporated in zoom lenses of a manual focus type since such a lens system permits a front cell lens unit to move the same quantity with respect to subjects lying at the same object distance regardless of magnification-varying states, and is accordingly advantageous to manual focus.

Japanese Patent Publication No. 2561637 discloses a zoom lens having a structure where a lens unit closer to an image than the variable lens unit is used as an auto-focus lens unit and another lens unit closer to an object than the variable lens unit is used as a manual focus lens unit, and where one of these two focusing methods can be selected where appropriate, depending on focusing purposes.

U.S. Pat. No. 4,609,260 discloses a control method in which the auto-focus lens unit is forcefully returned to its reference position (a position serving as a reference for performing a positional control of the lens unit) upon switching from an AF mode to an MF mode in the zoom lens disclosed in the above-mentioned patent document.

Unfortunately, when the auto-focus lens unit is simply moved to its reference position in a forceful manner, as in the zoom lens disclosed in U.S. Pat. No. 4,609,260, upon switching from the AF mode to the MF mode, a focus state of the lens apparatus achieved by auto focus is changed to a non-focus state of the same, thereby resulting in unfocused pictures until focusing is manually achieved in the MF mode.

SUMMARY OF THE INVENTION

The present invention provides a drive controller of a lens apparatus for preventing, as much as possible, a focal shift occurring upon switching from an AF mode to an MF mode.

In accordance with one aspect of the present invention, a drive controller of a lens apparatus including a first lens unit moving for performing manual focus and a second lens unit moving for performing auto-focus includes a control device switchable between a first mode performing an auto-focus drive control of the second lens unit and a second mode maintaining the second lens unit in an unmovable state at a predetermined position. The control device has a third mode controlling drive of the second lens unit so as to maintain a focus state of the lens apparatus upon receiving a command for switching the first mode to the second mode, on the basis of positional information of the first lens unit, and moves to the second mode upon detecting that the second lens unit has reached the predetermined position in the third mode.

Also, in accordance with another aspect of the present invention, a drive controller of a lens apparatus including a first lens unit moving for performing manual focus and a second lens unit moving for performing auto-focus includes a control device switchable between a first mode performing an auto-focus drive control of the second lens unit and a second mode maintaining the second lens unit in an unmovable state at a predetermined position. The control device has a third mode performing the focus drive control until detecting that the second lens unit has reached the predetermined position and, in the third mode, upon receiving a command for switching the first mode to the second mode, moves to the second mode in response to detecting that the second lens unit has reached the predetermined position.

According to the present invention, when a command for switching from the first mode (the auto focus mode) to the second mode (the manual focus mode) is received, the focus state of the lens apparatus is maintained in the third mode until the second lens unit reaches (returns to) a predetermined position associated with the second mode, whereby switching from the first mode to second mode can be performed without resulting in an out-of-focus picture being taken.

Further features and advantages of the present invention will become apparent from the following description of exemplary embodiments with reference to the attached drawings.

DESCRIPTION OF THE EMBODIMENTS

Embodiments of the present invention will be described with reference to the attached drawings.

First Embodiment

Figure 1:
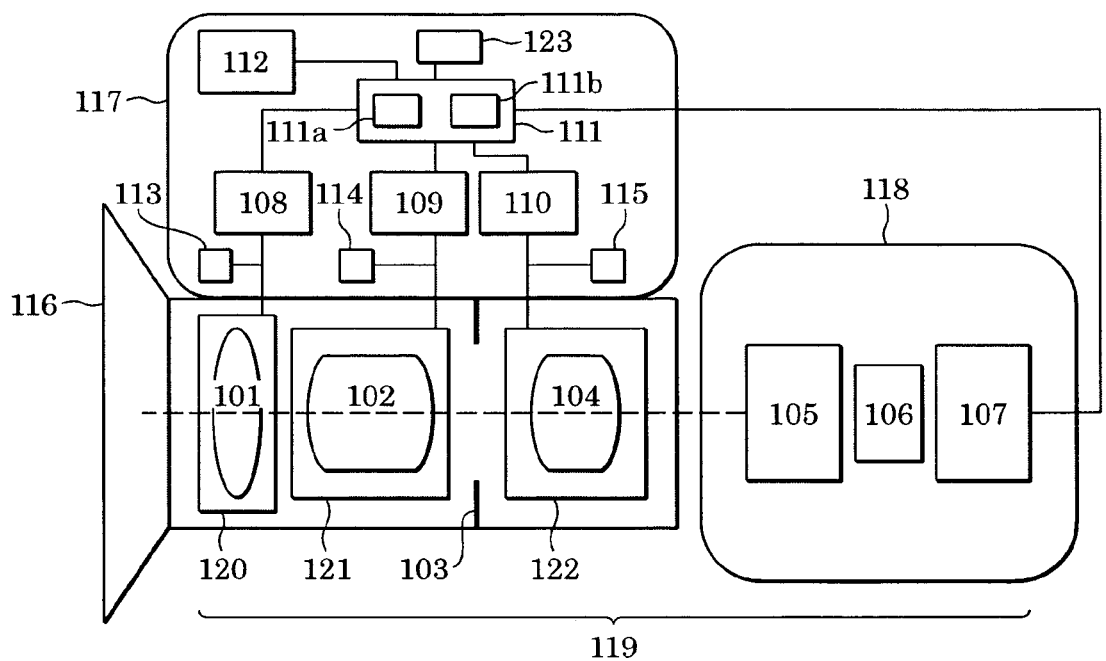
FIG. 1 is a block diagram illustrating the structure of a photographic system according to a first embodiment of the present invention.

FIG. 1 illustrates the structure of a photographic system 119 according to a first embodiment of the present invention. The photographic system 119 according to the present embodiment is made up by three components of a camera (a photographic apparatus) 118 such as a TV camera or a video camera and a zoom lens (lens apparatus) 116 mounted on the camera. The present invention is also applicable to a lens apparatus in which the zoom lens has functions of a drive unit built therein.

The zoom lens 116 has a drive unit (a drive controller) 117 placed thereto, wherein these two components make up a zoom lens system.

In addition, the zoom lens 116, according to the present embodiment, is made up, in the order from an object to an image, by a lens unit (a first lens unit, hereinafter, referred to as an MF lens unit) 101, a part or the overall of which moving along the optical axis for performing manual focus; a magnification varying lens unit 102, a part or the overall of which moving along the optical axis for performing magnification-varying; an aperture unit 103 for adjusting a quantity of light; and a lens unit (a second lens unit, hereinafter, referred to as an AF lens unit) 104, a part or the overall of which moving along the optical axis for performing auto-focus. The MF lens unit 101 is driven by mechanically transmitting a rotation of a manual focus operation ring (not shown) disposed on the zoom lens 116 or with a motor driven through transducing the rotation into an electrical signal. In the present embodiment, the MF lens unit 101 is driven with the latter method.

These lens units 101, 102, and 104, and the aperture unit 103 make up a photographic system. The zoom lens 116 according to the present embodiment is of a combined type of front cell and rear focus types.

The photographic system 119 also includes a magnification-varying mechanism 121 such as a cam, an MF drive mechanism 120, and an AF drive mechanism 122, respectively for driving the magnification-varying lens unit 102, the MF lens unit 101, and the AF lens unit 104, all along the optical axis. Each of these drive mechanisms 120 to 122 is activated upon receipt of a drive force from the drive unit 117. Alternatively the drive mechanism can be activated by mechanically transmitting a manual operation force as described above.

The drive unit 117 includes a magnification-varying control unit 109, including a zoom actuator such as a motor serving as a drive source of the magnification-varying lens unit 102 and its drive circuit, an AF control unit 110 including an AF actuator serving as a drive source of the AF lens unit 104 and its drive circuit, and an MF drive control unit 108 including an MF actuator serving as a drive source of the MF lens unit 101 and its drive circuit. While a control unit (not shown) including an actuator and its drive circuit is provided for the aperture unit 103, the aperture unit 103 can be also driven by mechanically transmitting a manual operation force.

The drive unit 117 also includes: a zoom position detector 114 such as an encoder or a potentiometer, connected to the magnification-varying drive mechanism 121 and detecting the position of the magnification-varying lens unit 102; an MF position detector 113 such as an encoder, connected to the MF drive mechanism 120 and detecting the position of the MF lens unit 101; and an AF position detector 115 such as an encoder, connected to the AF drive mechanism 122 and detecting the position of the AF lens unit 104.

The drive unit 117 also includes a lens control circuit 111 serving as a controller for controlling a variety of operations of the drive unit 117. The lens control circuit 111 has a CPU (not shown) performing a variety of computations, a temporary memory 111a, and a data memory 111b built therein. The temporary memory 111a temporarily stores positional information obtained on the basis of signals from the AF position detector 115, the MF position detector 113, and the zoom position detector 114. The data memory 111b stores zoom-tracking data, which will be described later, and positional information of the magnification-varying lens unit 102 corresponding to each variable magnification ratio in a one-to-one relationship. In the present embodiment, each of the MF position detector 113 and the AF position detector 115 outputs a pulse signal in accordance with a move quantity of the corresponding one of the MF and AF lens units. Positional information of each lens unit is obtained by counting an increased or decreased number of pulses of the pulse signal with respect to corresponding one of MF and AF reference positions, which will be described later.

The drive unit 117 also includes a mode selection switch 112. An operator selectively sets either an auto-focus mode (an AF mode) or a manual focus mode (an MF mode) by operating the switch 112. An output (a switching command signal) of the mode selection switch 112 is always monitored by the lens control circuit 111. Switching between the AF mode and the MF mode is carried out in accordance with an operation of the mode selection switch 112 disposed in the drive unit 117. Alternatively, the switching may be performed in accordance with a switching command signal from a control box (not shown) disposed independently from the drive unit 117 or from a remote operation system disposed in a control room disposed away from a broadcast studio.

The drive unit 117 further includes a display unit 123 displaying, to an operator or the like, that which one of the AF mode, the MF mode and a transitional mode (a third mode), which will be described later, corresponds to the present focus mode. The focus mode is displayed in accordance with a display signal from the lens control circuit 111. Alternatively, the focus mode may be displayed on a display unit such as a viewfinder disposed in the camera 118 by transmitting the display signal from the lens control circuit 111 to the camera 118.

The camera 118 includes: a glass block 105 corresponding to an optical filter or a color separation prism; an image pickup device 106 such as a CCD sensor or a CMOS sensor 106, performing photoelectric transfer of a subject image formed by a photographic system; and a camera control circuit 107 responsible for controlling the camera 118. The control circuit 107 has, for example, a CPU (not shown) performing a variety of computations, and an image processing circuit performing a variety of image processes of an image pickup signal from the image pickup device 106 built therein.

Operations of the lens control circuit 111 and the zoom lens 116 will now be described. When focusing is to be achieved by auto focus, the AF mode is selected by the mode selection switch 112. In this case, the lens control circuit 111 outputs an AF mode display signal to the display unit 123 for displaying a state of the AF mode being set.

In the AF mode, the lens control circuit 111 controls the MF lens unit 101 so as to be unmovable at the MF reference position, that is, the MF lens unit is controlled so as not move from the MF reference position even when a manual focus operation is performed. With this arrangement, a focusing operation is automatically performed by driving the AF lens unit 104 under control of the lens control circuit 111.

When a drive control of the AF lens unit 104 (an AF drive control) is performed, on the basis of the zoom-tracking data stored in the data memory 111b and an AF evaluation signal (focal information) representing a sharpness (or a contrast) of a picture and computed by using an image pickup signal sent from the camera 118 and corresponding to a focal state of the lens apparatus, the lens control circuit (CPU) 111 computes a drive direction of the AF lens unit 104 so as to move closer to a focus position of the lens apparatus and outputs a drive command for driving the AF lens unit 104 in the drive direction by a predetermined quantity of drive. The AF control unit 110 is activated upon receiving the drive command, whereby the AF lens unit 104 is driven to the focus position and is controlled so as to maintain the focus state after focus achievement.

Meanwhile, instead of generation of an AF evaluation signal with the CPU in the lens control circuit 111, the CPU in the camera control circuit 107 may generate an AF evaluation signal so that the lens control circuit 111 takes it therein so as to use it for performing the AF drive control.

The zoom-tracking data pertains to a position of the AF lens unit 104 for, in the AF mode, compensating fluctuation of an image plane in accordance with movement of the magnification-varying lens unit 102, in a state in which the MF lens unit 101 is fixed at the MF reference position, and is previously stored in the data memory 111b so as to serve as, for example, date of positions of the AF lens unit 104 corresponding to respective positions of the magnification-varying lens unit 102.

When focus adjustment is performed by the manual focus, the MF mode is selected by the mode selection switch 112. In the MF mode, the lens control circuit 111 outputs an MF mode display signal to the display unit 123 for displaying a state of the MF mode being set.

Also, in the MF mode, the lens control circuit 111 controls the AF lens unit 104 so as to be unmovable at the AF reference position. That is, at a position serving as a reference for detecting a drive quantity (a position) of the AF lens unit 104 (e.g., the lens controller 111 is operated in a control flow in which a computation for the AF drive control is not performed or a drive for the AF lens unit 104 is not carried out although the computation is performed).

The focus adjustment in the MF mode is performed by driving the MF lens unit 101, for example, such that an operator visually operates a manual focus operation ring so as to activate the MF drive mechanism 120 through the lens control circuit 111. Hereinafter, the drive of the MF lens unit 101 is called manual drive.

The lens control circuit 111 detects positional information of the MF lens unit 101 on the basis of a signal from the MF position detector 113.

A general operation of the lens control circuit 111 during switching from the AF mode to the MF mode will now be described.

When the mode selection switch 112 is switched from the AF mode to the MF mode, and the lens control circuit 111 receives a switching command signal, the lens control circuit 111 switches to the transitional mode. At the time when the mode selection switch 112 is switched, the MF lens unit 101 is located at the MF reference position and the AF lens unit 104 is located at a position (the AF reference position or a position moved from the AF reference position) at which the focus of the lens apparatus is maintained in accordance with a magnification-varying ratio and an object distance of the lens apparatus.

In order to bring about a state in which the manual focus can be performed by manual drive of the MF lens unit 101, the AF lens unit 104 must be returned to the AF reference position.

In the transitional mode, after the mode selection switch 112 is switched from the AF mode to the MF mode (e.g., upon receiving a switching command signal), the lens control circuit 111 performs the AF drive control of the AF lens unit 104 through the AF control unit 110. That is, the lens control circuit 111 performs a control so as to maintain a focus state of the lens apparatus, in following-suit of the manual drive of the MF lens unit 101. In the meantime, in the transitional mode according to the present embodiment, the AF drive control is performed by a different method from that in the AF mode, which will be described later.

The lens control circuit 111 moves completely to the MF mode upon return of the AF lens unit 104 to the AF reference position in the transitional mode.

In the transitional mode, the lens control circuit 111 sends a transitional-mode display signal to the display unit 123 so that the unit displays a state of being in the transitional mode.

Also, in the transitional mode, the lens control circuit 111 sequentially obtains positional information of the MF lens unit 101, the AF lens unit 104, and the magnification-varying lens unit 102 on the basis of signals from the position detectors 113, 115, and 114, respectively.

When the AF lens unit 104 being subjected to the AF drive control in accordance with movement of the MF lens unit 101 returns to the AF reference position as described above, the lens control circuit 111 detects the above return on the basis of a signal from the AF position detector 115, outputs a signal to the AF control unit 110 so as to fix the AF lens unit 104 at the AF reference position, and sends an MF mode display signal to the display unit 123 for displaying a state of being in the MF mode.

Figure 2:
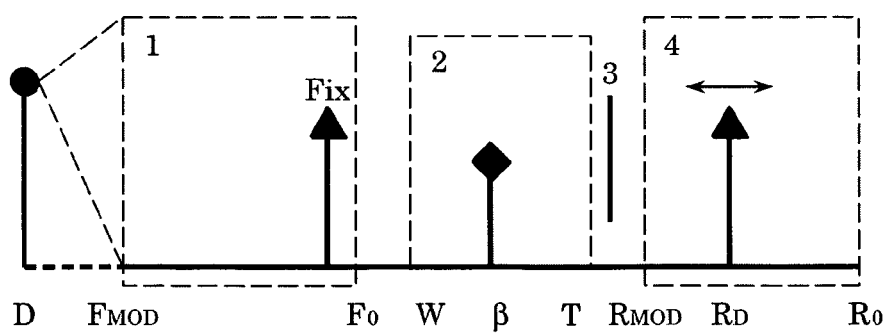
FIG. 2 illustrates a state of a zoom lens of the photographic system in an AF mode, according to the first embodiment.

FIG. 2 conceptually illustrates a state of the zoom lens 116 in the AF mode, wherein reference numbers 1, 2, 3, and 4 correspond respectively to the MF lens unit 101, the magnification-varying lens unit 102, the aperture unit 103, and the AF lens unit 104 shown in FIG. 1. An object distance and a magnification-varying ratio in this case are respectively represented by D and an arbitrary value $\beta$.

In FIG. 2, an MF lens unit 1 is fixed at an MF reference position $F_0$. Reference $R_0$ represents an AF reference position of an AF lens unit 4. Also, references $F_{MOD}$ and $R_{MOD}$ respectively represent positions at which the MF lens unit 1 and the AF lens unit 4 move to the nearest side. Further, references W and T respectively represent positions of a wide-angle end and a telephoto end at which a magnification-varying unit 2 performs magnification-varying. FIG. 2 illustrates that the AF lens unit 104 achieves focusing with the magnification-varying ratio $\beta$ and the object distance D, at a position $R_D$ lying closer to an object than the AF reference position $R_0$.

Figure 3:
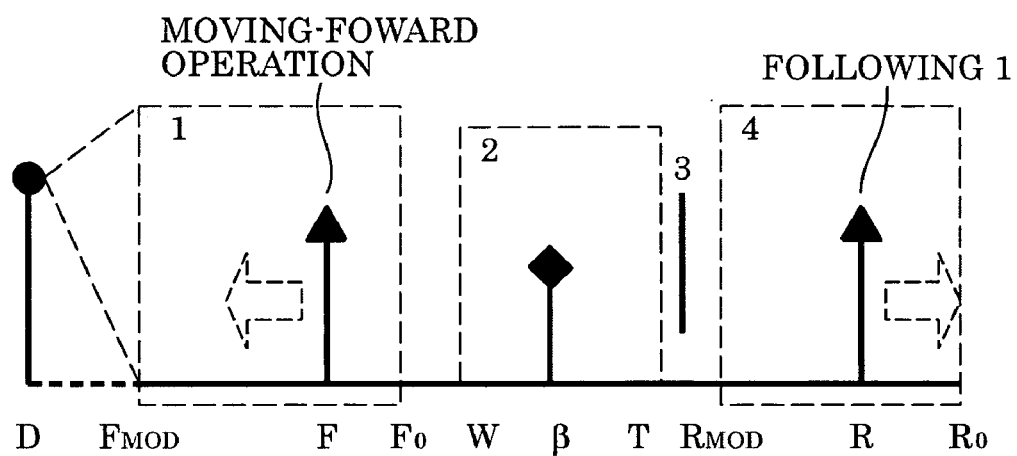
FIG. 3 illustrates a state of the zoom lens of the photographic system in a transitional mode, according to the first embodiment.

Upon receiving a command signal for switching from the AF mode to the MF mode, the lens control circuit 111 switches to the transitional mode, releases fixing of the MF lens unit 1, and performs the AF drive control of the AF lens unit 4 in accordance with movement of the MF lens unit 1 so as to maintain the focus state of the lens apparatus. FIG. 3 illustrates the above-mentioned state of the zoom lens in the transitional mode. Positions of the MF and AF lens units 1 and 4 in this state are represented by F and R, respectively.

Figure 4:
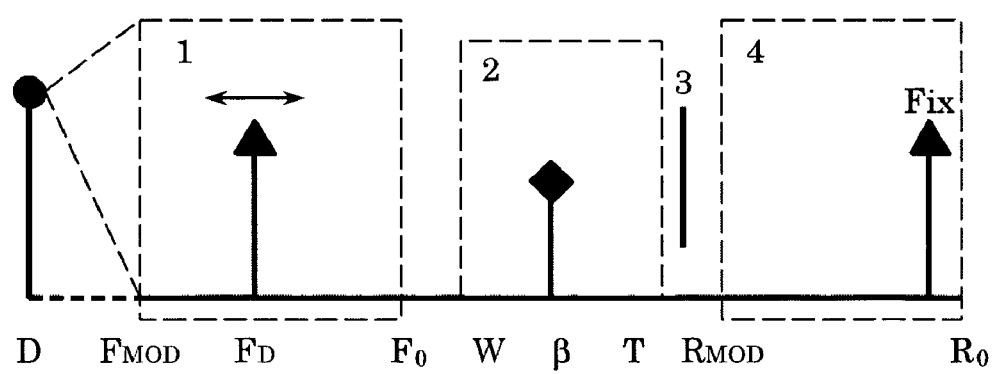
FIG. 4 illustrates a state of the zoom lens of the photographic system in an MF mode, according to the first embodiment.
Figure 5:
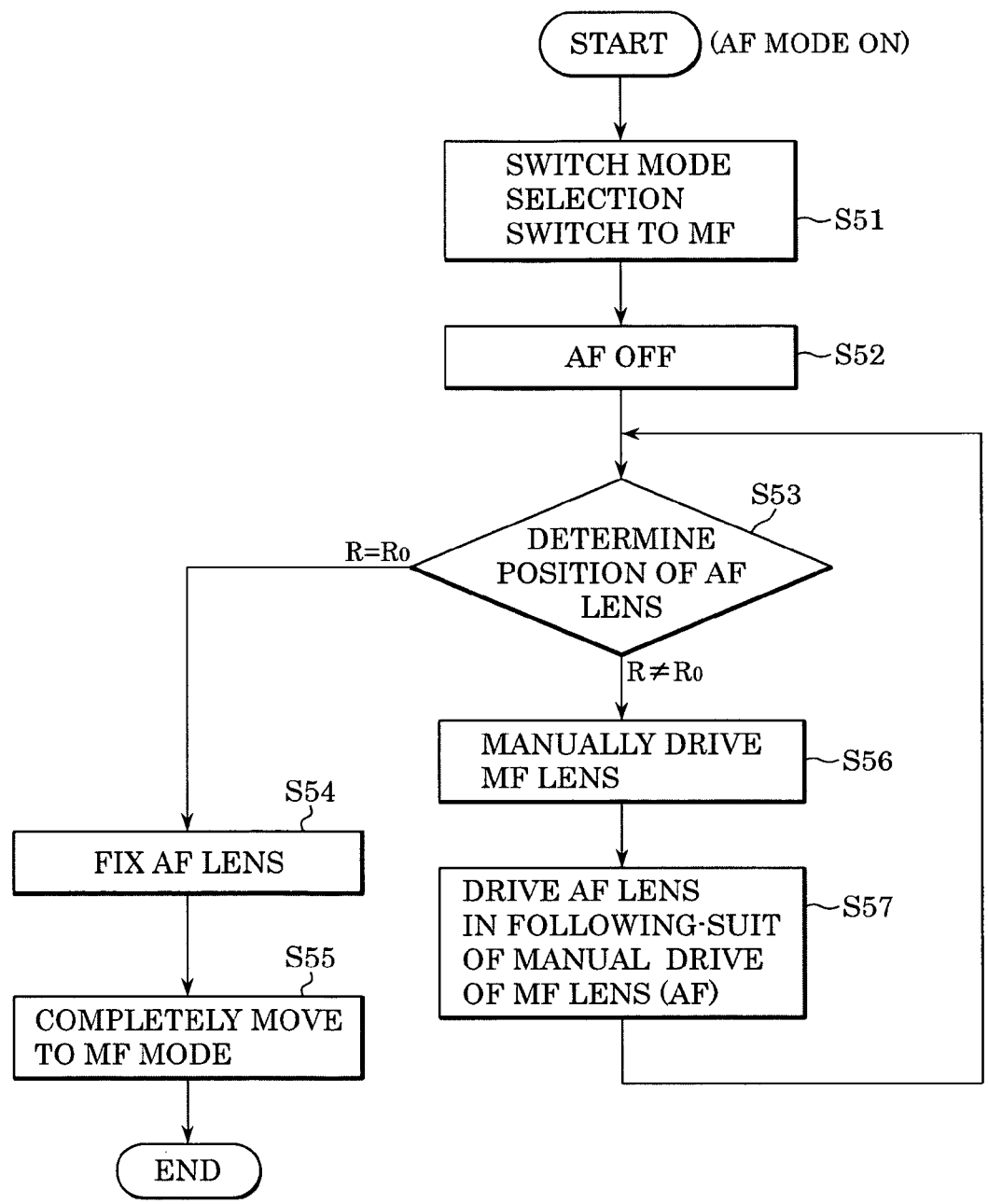
FIG. 5 is a flowchart illustrating an operation of the photographic system according to the first embodiment.

FIG. 4 illustrates a state of the zoom lens in which, in the transitional mode, the AF lens unit 4 returns to the AF reference position $R_0$ and the lens control circuit 111 moves to the MF mode. In this state, the lens control circuit 111 fixes the AF lens unit 4 at the AF reference position $R_0$, and the MF lens unit 1 is manually driven to a position $F_D$ at which a subject located at distance D away is brought into focus.

As described above, the operation of the lens control circuit (CPU) 111 is performed according to a computer program shown in a form of a flowchart illustrated in FIG.

5. Operations of the respective lens units will be described also with reference to FIG. 4.

In step S51, the mode selection switch 112 is switched to the MF mode when the lens control circuit 111 receives a switching command signal) in the AF mode. Then, in step S52, the lens control circuit 111 switches to the transitional mode and stops the AF drive control which has been performed in the AF mode. Next, in Step S53, the lens control circuit 111 determines whether a position (R) of the AF lens unit 4 coincides with the AF reference position ($R_0$) on the basis of a signal from the AF position detector 115. If the positions coincide, (i.e., $R=R_0$), the process proceeds to step S54.

In step S54, the lens control circuit 111 sends a signal to the AF control unit 110 to fix the AF lens unit 104, rendering it unmovable. With this arrangement, the AF lens unit 104 is fixed at the AF reference position.

Subsequently, in step S55, the lens control circuit 111 outputs an MF mode signal to the display unit 123 for displaying a state of being in the MF mode. In this way, the lens control circuit 111 moves to the MF mode.

If, however, in step S53, the positions do not coincide (i.e., $R \neq R_0$), the lens control circuit 111 outputs a transitional mode signal to the display unit 123 for displaying a state of being in the transitional mode.

In step S56, the MF lens unit 1 is manually driven, which results in the lens control circuit 111 obtaining positional information of the MF lens unit 1 on the basis of a signal from the MF position detector 113. Then, in step S57, the MF lens unit 1 performs the AF drive control of the AF lens unit 104 so as to maintain the focus state of the lens apparatus.

Upon start of the AF drive control in the transitional mode, the lens control circuit 111 monitors positional information of the AF lens unit 4 and continues performing the AF drive control until the lens control circuit 111 determines that the AF lens unit 104 is located at the AF reference position (that is, $R=R_0$) in step S53. When the AF lens unit 104 is determined to be located at the AF reference position in step S53, the process moves to steps S54 and S55, and the lens control circuit 111 moves to the MF mode.

The AF drive control performed in the transitional mode will now be described. It is presumed that a focus state of the lens apparatus is achieved in the transitional mode shown in FIG. 3. An object distance, a magnification-varying ratio (or a position of the magnification-varying unit 2), a position of the MF lens unit 1, and a position of the AF lens unit 4 in this state are respectively defined by D, β, F, R. Also, back-focus sensitivities of the MF and AF and lens units 1 and 4 in this state are respectively defined by αF and αR. In addition, it is assumed that the object distance D remains unchanged in the transitional mode. Thus, when a move quantity ΔXr of the AF lens unit 4 in accordance with a move quantity ΔXf of the MF lens unit 1 satisfies Expression (1), the focus state of the lens apparatus is maintained.

$$\Delta Xr = -\alpha F/\alpha R \times \Delta Xf \quad (1)$$

When the ratio (αR/αF) of the back-focus sensitivity of the AF lens unit 4 to that of the MF lens unit 1 is defined by x, ΔXr is given by a function of a magnification-varying ratio β, a position F of the MF lens unit 1, and an object distance D, that is expressed by x(β, F, D).

When it is presumed that FIG. 2 shows a focus state of the lens apparatus immediately before the mode selection switch 112 is switched from the AF mode to the MF mode, in other words, when it is presumed that a magnification-varying ratio is defined by β, the MF lens unit 1 is located at the MF reference position $F_0$, and also the AF lens unit 4 is located at the focus position $R_D$ under the object distance D, the object distance D is defined by a function $D(R_D, \beta_D)$, wherein $R_D$ represents a position of the AF lens unit 4 in the AF mode while the MF lens unit is fixed at the MF reference position $F_0$, and $\beta_D$ represents a magnification-varying ratio in that state.

As a result, the ratio x of the back-focus sensitivity of the MF lens unit 1 to that of the AF lens unit 4 is expressed by $x(\beta, F, D(R_D, \beta_D))$ by using the position $R_D$ of the AF lens unit 4 and the magnification-varying ratio $\beta_D$ immediately before switching to the MF mode.

The value x as information given by three parameters of the positional information (that is, the position) F of the MF lens unit 1, the position $R_D$ of the AF lens unit 4 immediately before switching to the MF mode, that is, the object distance D, and a magnification-varying ratio β (or the position of the variable lens unit 2) is stored in the data memory 111b shown in FIG. 1. With this arrangement, the lens control circuit 111 can control the position of the AF lens unit 4 in association with that of the MF lens unit 1, thereby moving to the MF mode while maintaining the focus state of the zoom lens 116.

Although, in the present embodiment, the lens control circuit 111 stores the ratio (x) of the back-focus sensitivity of the MF lens unit to that of the AF lens unit in the data memory 111b and computes a position of the AF lens unit for maintaining the focus state of the zoom lens by referring to the value, in place of storing the ratio of the back-focus sensitivities, the lens control circuit 111 can previously store a position (F) of the MF lens unit, a position (R) of the AF lens unit, and a magnification-varying ratio (β) for maintaining the focus state of the zoom lens under an object distance $D(R_D, \beta_D)$ and perform the AF drive control of the AF lens unit according to these pieces of data in accordance with the position of the MF lens unit.

Second Embodiment

Although the AF drive control in the transitional mode described in the first embodiment is performed by directly using ratio data of the back-focus sensitivities of the MF and AF lens units, the AF drive control may be performed in the transitional mode by actively using an AF evaluation signal used in the AF mode.

Figure 6:
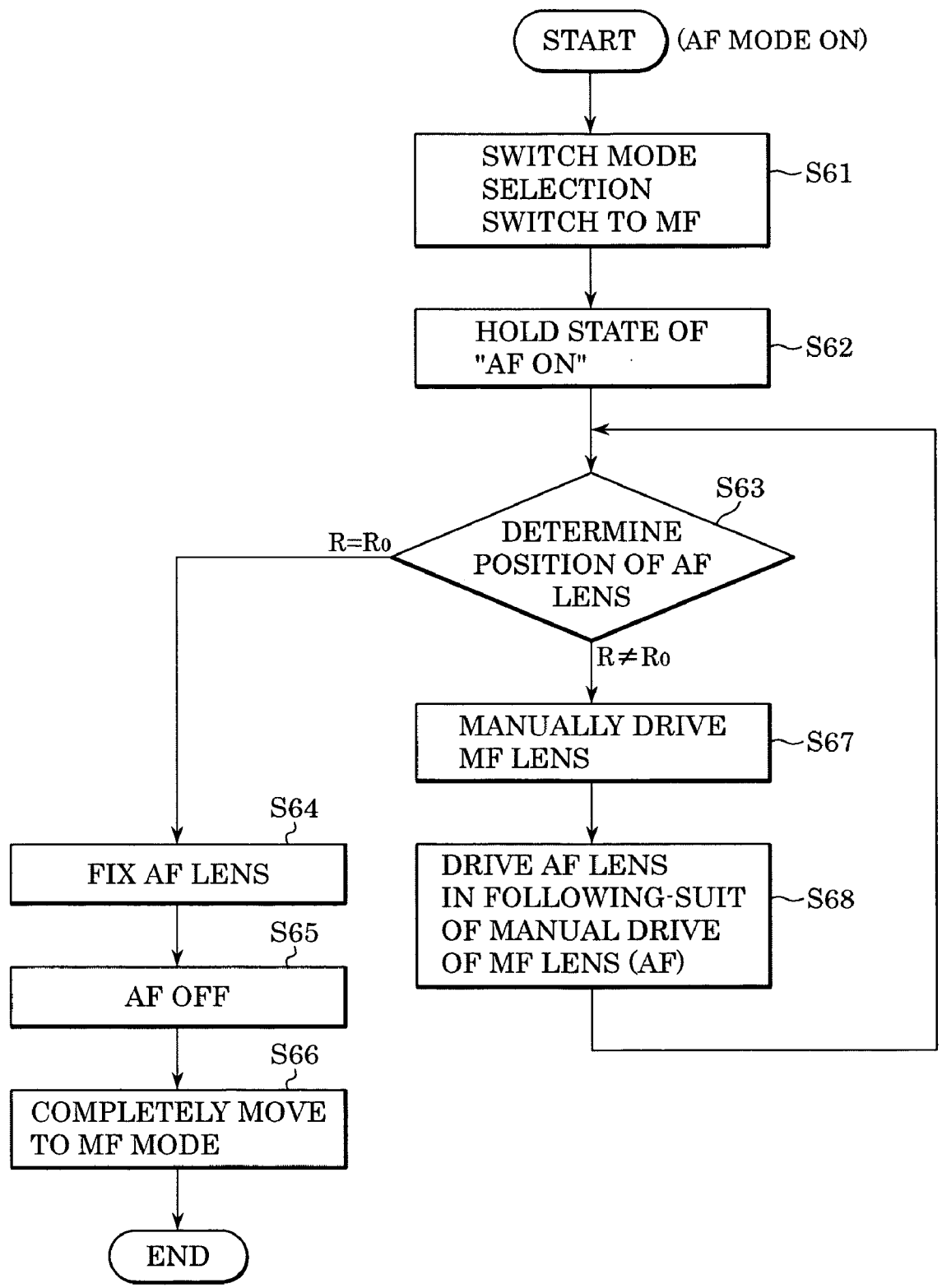
FIG. 6 is a flowchart illustrating an operation of a photographic system according to a second embodiment.

FIG. 6 illustrates a flowchart of a computer program for operating the lens control circuit (CPU) 111 in this case. Since the structure of a photographic system according to the present embodiment is same as that in the first embodiment, the reference numbers shown in FIGS. 1 through 4 will be applied in the following description.

In step S61, the mode selection switch 112 is switched from the AF mode to the MF mode when the lens control circuit 111 receives a switching command signal in the AF mode. Next, in step S62, as a result, the lens control circuit 111 switches to the transitional mode and continues performing the AF drive control, which uses an AF evaluation signal and which is performed in the AF mode. Then, in step S63, the lens control circuit 111 obtains positional information of the AF lens unit 4 on the basis of a signal from the AF position detector 115 and determines whether or not the AF lens unit 4 is located at the AF reference position.

If the AF lens unit 4 is located at the AF reference position (i.e., $R=R_0$), then in step S64, the lens control circuit 111 fixes the AF lens unit 4 at the AF reference position, in step S65 stops the AF drive control, and in step S66 moves completely to the MF mode.

If, however, the AF lens unit 4 is not located at the AF reference position (i.e., $R \neq R_0$), then in step S67, the MF lens unit 1 is manually driven. Next, in step S68, the lens control circuit 111 performs the AF drive control of the AF lens unit 4 by using an AF evaluation value, in following-suit of the manual drive of the MF lens unit 1 performed in step S67. With this arrangement, even when the MF lens unit 1 is manually driven, the focus state of the zoom lens is maintained. This state may be called a transitional state (a transitional mode) from the AF mode to the MF mode and also a continuing state of the AF mode cancelled under the condition that the AF lens unit 4 reaches the AF reference position.

The AF drive control in such a transitional mode is continuously performed until the AF lens unit 4 is determined, in step S63, to be located at the AF reference position. Then, when the AF lens unit 4 is determined to be located at the AF reference position, the process then proceeds to steps S64 through S66, and the lens control circuit 111 moves to the MF mode.

As described above, according to the present embodiment, when the AF drive control of the AF lens unit is performed in following-suit of the manual drive of the MF lens unit 1 so as to maintain the focus state of the zoom lens in the transitional mode, an AF evaluation signal used in the AF mode is utilized. While a type of the AF drive control in the transitional mode is described in the first embodiment, according to the present embodiment, the focus state of the zoom lens can be maintained in the transitional mode under the condition of a constant object distance. The focus state of the zoom lens can be maintained without applying limitation to the object distance.

Third Embodiment

In each of the first and second embodiments, the drive of the AF lens unit is allowed in the transitional mode, regardless of a drive direction of the AF lens unit driven in following-suit of the manual drive of the MF lens unit. However, there is a risk that the control in the transitional mode described in the each of the first and second embodiments does not achieve a quick move from the AF mode to the MF mode for some reason. For example, fluctuation of an object distance in the transitional mode or a zooming operation.

Figure 7:
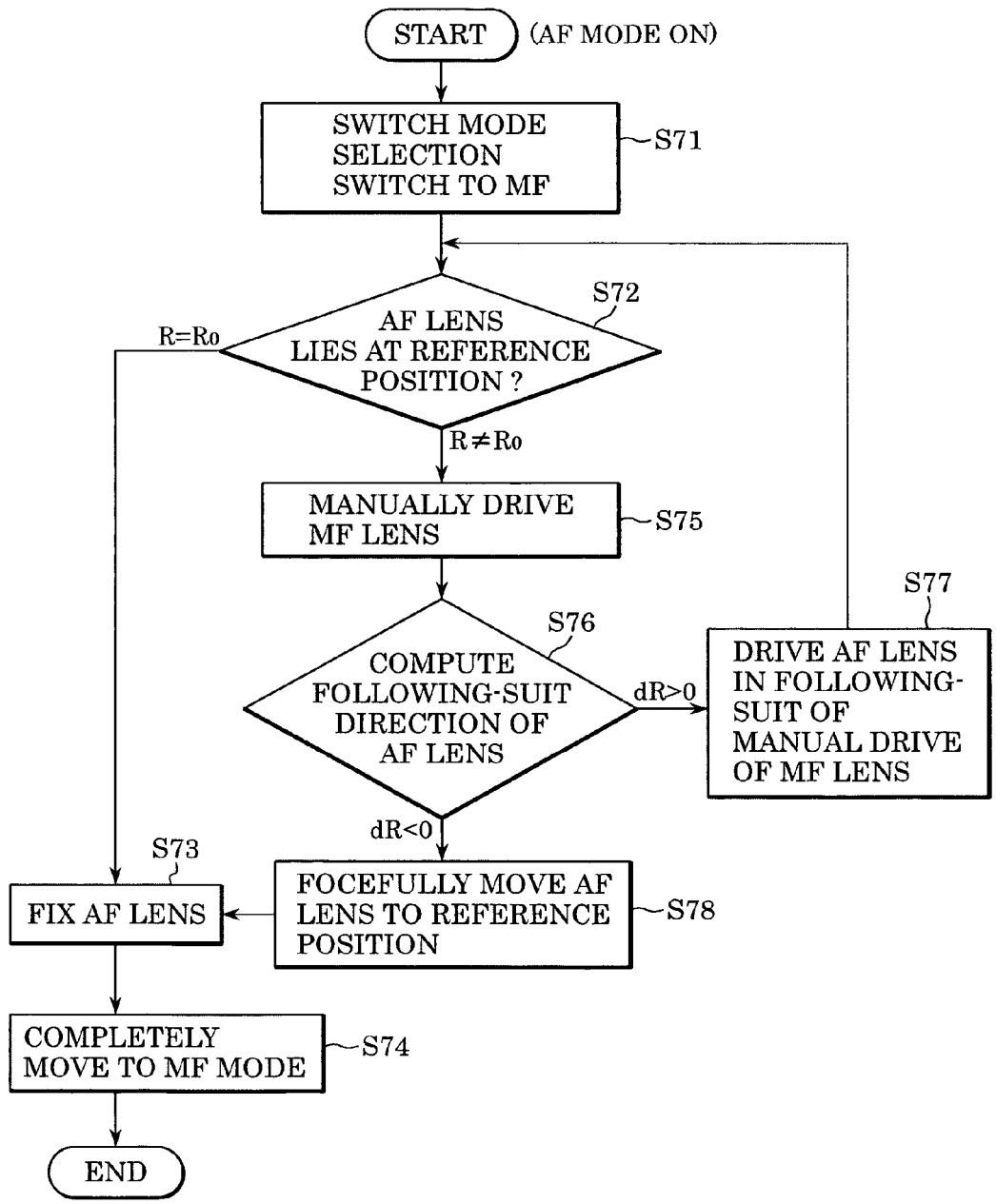
FIG. 7 is a flowchart illustrating an operation of a photographic system according to a third embodiment.

In view of the above risk, a computer program implementing an operation of the lens control circuit 111 according to a third embodiment of the present invention having steps incorporated therein in order to avoid such a problem will be described with reference to a flowchart illustrated in FIG. 7. Since the structure of a photographic system according to the present embodiment is same as that in the first embodiment, the reference numbers shown in FIG. 1 through 4 will be applied in the following description.

In step S71, while in the AF mode, the mode selection switch 112 is switched from the AF mode to the MF mode when the lens control circuit 111 receives a switching command signal. Next, in step S72, the lens control circuit 111 obtains positional information of the AF lens unit 4 on the basis of a signal from the AF position detector 115 and determines whether or not the AF lens unit 4 is located at the AF reference position.

If, in step S72, the AF lens unit 4 is located at the AF reference position, flow proceeds to step S73, where the lens control circuit 111, in the same fashion as in each of the first and second embodiments, fixes the AF lens unit 4 at the AF reference position. In step S74, the lens control circuit 111 moves to the MF mode.

If, in step S72, the AF lens unit 4 is not located at the AF reference position, flow proceeds to step S75, where the MF lens unit 1 is manually driven. Next, in step S76, the lens control circuit 111 performs a computation (drive target direction dR of the AF lens unit 4) for the AF drive control according to the method described in the first or second embodiment so as to follow suit of the manual drive of the MF lens unit 1 performed in step S75.

In step S76, the lens control circuit 111 also determines whether the AF lens unit 4 moves closer to the AF reference position in the computed drive target direction dR. If the AF lens unit 4 moves closer to the AF reference position in the computed drive target direction, i.e., dR>0), then, in step S77, the AF drive unit 4 is driven in the drive target direction by a predetermined quantity or a computed drive target quantity. The process then returns to step S72.

If the AF lens unit 4 moves away from the AF reference position in the computed drive target direction dR, i.e., dR<0, the process moves to step S78, where the lens control circuit 111 forcefully drives the AF lens unit 4 to the AF reference position, fixes the AF lens unit 4 (in step S73), and moves to the MF mode (in step S74).

According to the present embodiment, although the focus state of the zoom lens cannot be always maintained during a transitional period from step S76 to step S78, the lens control circuit 111 can be more quickly moved to the MF mode than in the case of driving the AF lens unit 4 away from the AF reference position, which would result in the possibility of a prolonged transitional state from the AF mode to the MF mode which in turn would result in less operator confusion.

Fourth Embodiment

As described in the third embodiment, when it is determined that the AF lens unit 4 is moving away from the AF reference position, then the AF lens unit 4 is forcefully moved to the AF reference position. In the fourth embodiment, as described below, in place of forcefully moving the AF lens unit 4 to the AF reference position, the lens control circuit 111 may prohibit driving of the AF lens unit 4 and bring it to a halt.

Figure 8:
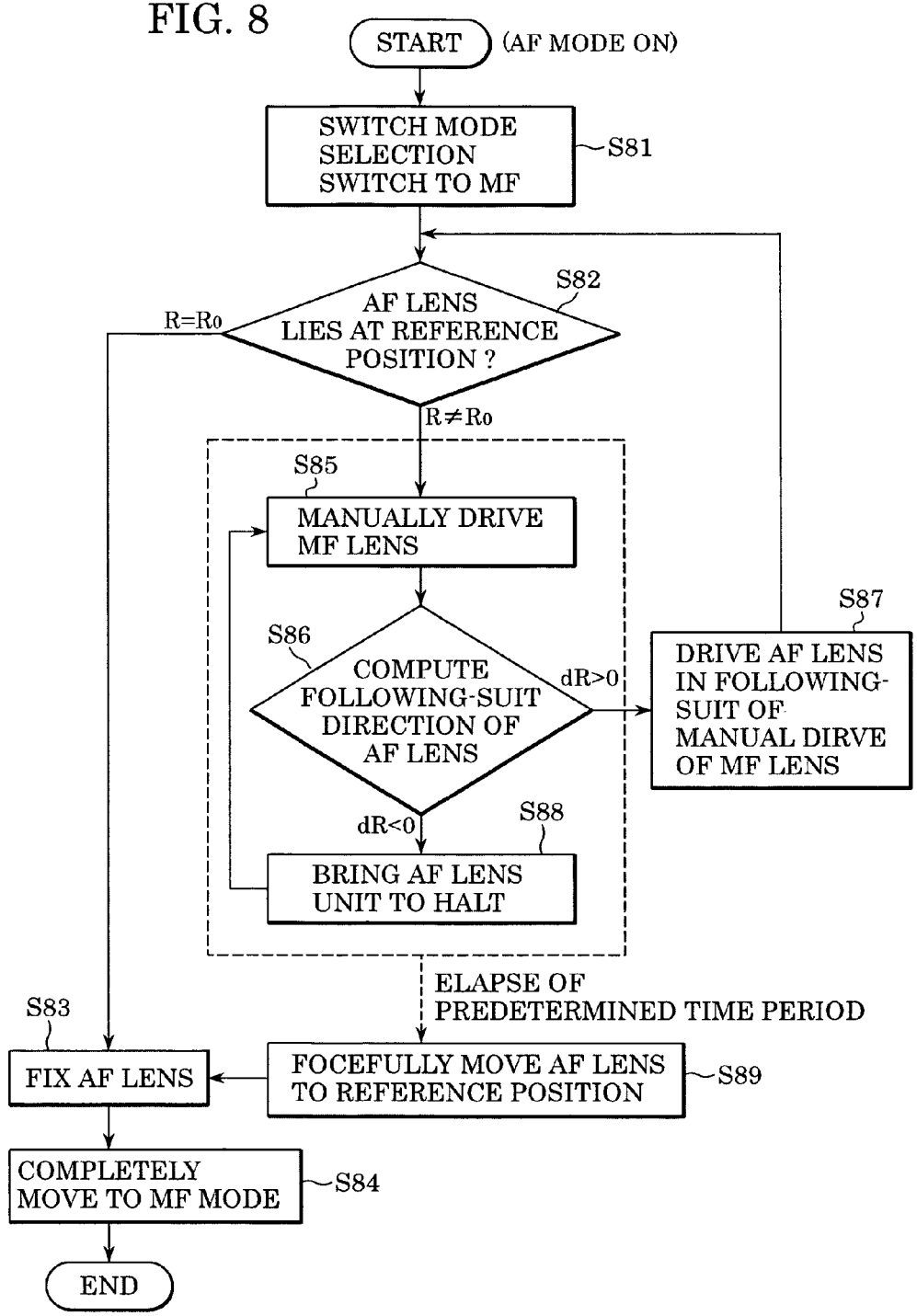
FIG. 8 is a flowchart illustrating an operation of a photographic system according to a fourth embodiment.

FIG. 8 illustrates a flowchart of computer program implementing an operation of the lens control circuit 111 according to a fourth embodiment of the present invention. Since the structure of a photographic system according to the present embodiment is same as that in the first embodiment, the reference numbers shown in FIG. 1 through 4 will be applied in the following description.

In step S81, while in AF mode, selection switch 112 is switched from the AF mode to the MF mode when the lens control circuit 111 receives a switching command signal in the AF mode. Then, in step S82, the lens control circuit 111 obtains positional information of the AF lens unit 4 on the basis of a signal from the AF position detector 115, and determines whether the AF lens unit 4 is located at the AF reference position.

If the AF lens unit 4 is located at the AF reference position, then in step S83, the lens control circuit 111, in the same fashion as in each of the first and second embodiments, fixes the AF lens unit 4 at the AF reference position. The lens control circuit 111 then moves to the MF mode in Step 84.

If, the AF lens unit 4 is not located at the AF reference position, then in step S85, the MF lens unit 1 is manually driven. Next, in Step 86, the lens control circuit 111 performs a computation (drive target direction dR of the AF lens unit 4) for the AF drive control according to the method described in the first or second embodiment so as to following suit of the manual drive of the MF lens unit 1 performed in step S85.

In step S86, the lens control circuit 111 also determines whether the AF lens unit 4 moves closer to the AF reference position in the computed drive target direction dR. If the AF lens unit 4 moves closer to the AF reference position in the computed target direction, i.e., dR>0), then in step S87, the AF drive unit 4 is driven in the drive target direction by a predetermined quantity or a computed drive target quantity. The process then returns to step S82.

If the AF lens unit 4 moves away from the AF reference position in the computed drive target direction dR, i.e., dR<0, the process moves to step S88, where the lens control circuit 111 prohibits driving of the AF lens unit 4 in the computed drive target direction. That is, the lens control circuit 111 brings the AF lens unit 4 to a halt. The process then returns to step S85. When the MF lens unit 1 is again manually driven in step S85, and when, in step S86, it is determined that the AF lens unit 4 is moving closer to the AF reference position in the drive target direction dR, the AF drive control of the AF lens unit 4 is performed again so as to follow suit of the manual drive of the MF lens unit 1.

The above described operation loop continues until one of two events occurs. The first is the determination in step S86, as previously described, that the AF lens unit 4 is moving closer to the AF reference position and the determination in step S82, that the AF lens unit 4 is located at the AF reference position.

The second is the elapse of a predetermined time period, which should be set at one minute or shorter and is set at ten seconds in the present embodiment. The purpose of implementing a predetermined time period is as follows. Because the focus state of the zoom lens is not achieved while the AF lens unit 4 is halted in step S88, there are possibilities that not only the lens control circuit 111 will not move to the MF mode, but also that focusing will not achieved because of the manual drive of the MF lens unit 1, thereby resulting in possible operator confusion. In order to avoid such a problem, the AF lens unit 4 is halted for a predetermined time period, and when the time period elapses, the process proceeds to step S89, where the AF lens unit 4 is forcefully returned to the AF reference position. Then, the process moves to steps S83 and S84.

According to the present embodiment, although the focus state of the zoom lens cannot always be maintained during a transitional period from Step 86 to Step 88 and to Step 89, the lens control circuit 111 can be more quickly moved to the MF mode than in the case of driving the AF lens unit 4 away from the AF reference position, which would result in the possibility of a prolonged transitional state from the AF mode to the MF mode, which in turn would result in less operator confusion.

NUMERICAL EXAMPLE

Figure 9:
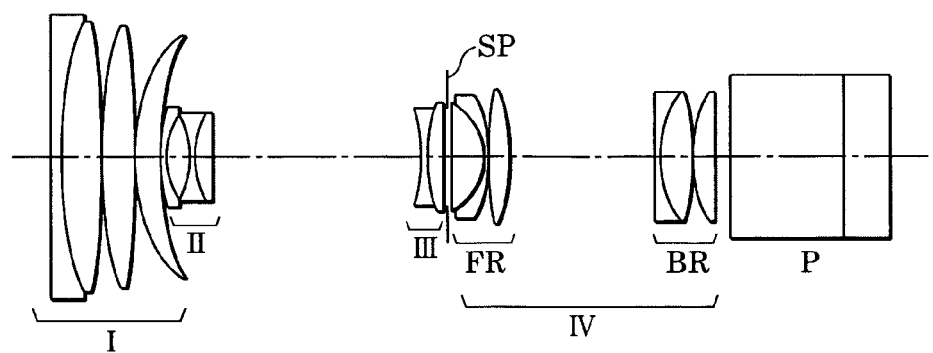
FIG. 9 is a sectional view of a zoom lens of the photographic system according to any one of the foregoing embodiments at its wide-angle end, used for a numerical example of the present invention.

A numerical example of a zoom lens suitable for each of the embodiment will now be described. FIG. 9 is a sectional view of the numerical example zoom lens at the wide-angle end of a lens apparatus.

The zoom lens shown in FIG. 9 includes, in the order from an object: a front cell lens unit I which has a positive refractive power so as to serve as an MF lens unit, which moves in the optical direction when performing the manual focus; a variator lens unit II, which has a negative refractive power that serves as a magnification-varying lens unit, and performs magnification-varying from the wide-angle end (Wide) to the telephoto end (Tele) of the lens apparatus while monotonously moving to an image plane; and a compensator lens unit III, which has a negative refractive power, and moves nonlinearly along the optical axis in a manner of drawing a trajectory projecting toward the object in order to compensate for fluctuation of an image plane. The variator lens unit II and the compensator lens unit III make up a magnification-varying system.

The zoom lens also includes an aperture SP, and a relay lens unit IV having a positive refractive power that serves as a second lens unit. The relay lens unit IV is unmovable during a magnification-varying operation, and is made up by a first lens sub-unit FR and a second lens sub-unit BR in the order from the object. The second lens sub-unit BR serves as the AF lens unit described in each of the first and second embodiments, which performs the focal adjustment by moving in the optical direction in the AF mode.

The zoom lens further includes a glass block P, such as a color separation prism or an optical filter.

In this numerical example, during performance of the manual focus, i.e., in the MF mode, the second lens sub-unit BR is fixed at the AF reference position and the focus adjustment is performed only by manually driving the front cell lens unit I.

During the auto-focus, i.e., in the AF mode, the front cell lens unit I is fixed at the MF reference position for example, a position at which an object at infinity is brought into focus. The second lens sub-unit BR must be driven by the AF drive control of the second lens sub-unit BR in accordance with changes in an object distance and a magnification-varying ratio.

Upon switching modes from the AF mode to the MF mode, the lens control circuit 111 moves to the MF mode through the transitional mode, as described in the foregoing embodiments.

Specifically, in accordance with the manual drive of the front cell lens unit I, the AF drive control function described in the first or second embodiment permits the second lens sub-unit BR to move while drawing a trajectory so as to maintain the focus state of the zoom lens. The AF drive control is performed until the second lens sub-unit BR reaches the AF reference position, and the lens control circuit 111 moves to the MF mode upon the second lens sub-unit BR reaching the AF reference position.

As described in the third embodiment, when the second lens sub-unit BR moves away from the AF reference position in the drive target direction of the second lens sub-unit BR in following-suit of the manual drive of the front cell lens unit I, in order to operator confusion and to quickly switch to the MF mode, the second lens sub-unit BR may be forcefully returned to the AF reference position so that the lens control circuit 111 moves to the MF mode even when the focus state of the zoom lens is not maintained.

Tables 1 and 2 show a variety of dimensions of the zoom lens illustrated in FIG. 9, presuming that a subject lies at infinity.

With respect to notations in Table 1, f represents a focal length of the overall system of the zoom lens, fno represents an F-number, ω (shown as "w") represents half an angle of view, ri represents a radius of curvature of the lens surface of an i-th lens from the object, di represents a gap between the lens surfaces of i-th and (i+1)-th lenses, and ni and vi (shown as "vi") respectively represent a refractive index and an Abbe number of a material constituting the i-th lens from the object. Meanwhile, a value 0.000 of ri indicates an infinitive value.

TABLE 1

| f = 7.6~111 | fno = 1:1.52~2.32 | 2w = 60.1~4.0 | |
|---|---|---|---|
| r1 = 1169.481 | d1 = 2.40 | n1 = 1.81255 | v1 = 25.4 |
| r2 = 98.49 | d2 = 10.83 | n2 = 1.51825 | v2 = 84.2 |
| r3 = −265.170 | d3 = 0.20 | n3 = 1.60548 | v3 = 60.7 |
| r4 = 124.037 | d4 = 8.29 | n4 = 1.64254 | v4 = 60.1 |
| r5 = −281.395 | d5 = 0.20 | n5 = 1.82017 | v5 = 48.6 |
| r6 = 51.797 | d6 = 6.46 | n6 = 1.77621 | v6 = 49.6 |
| r7 = 97.915 | d7 = Variable | n7 = 1.86501 | v7 = 23.9 |
| r8 = 71.045 | d8 = 0.90 | n8 = 1.79013 | v8 = 44.2 |
| r9 = 17.601 | d9 = 6.01 | n9 = 1.85501 | v9 = 23.9 |
| r10 = −21.542 | d10 = 0.90 | n10 = 1.61671 | v10 = 55.0 |
| r11 = 18.397 | d11 = 4.63 | n11 = 1.82017 | v11 = 46.6 |
| r12 = −4295.134 | d12 = Variable | n12 = 1.62508 | v12 = 53.2 |
| r13 = −27.245 | d13 = 0.90 | n13 = 1.81264 | v13 = 25.4 |
| r14 = 31.613 | d14 = 3.84 | n14 = 1.81264 | v14 = 25.4 |
| r15 = 1125.345 | d15 = Variable | n15 = 1.86152 | v15 = 50.9 |
| r16 = 0.000(Diaphragm) | d16 = 1.60 | n16 = 1.66152 | v16 = 50.9 |
| r17 = 10000.000 | d17 = 8.10 | n17 = 1.60718 | v17 = 38.0 |
| r18 = −15.601 | d18 = 1.20 | n18 = 1.51825 | v18 = 64.2 |
| r19 = −37.306 | d19 = 0.20 | | |
| r20 = 110.820 | d20 = 5.22 | | |
| r21 = −51.132 | d21 = 37.00 | | |
| r22 = 786.500 | d22 = 1.20 | | |
| r23 = 25.913 | d23 = 0.00 | | |
| r24 = 25.913 | d24 = 7.96 | | |
| r25 = −77.604 | d25 = 0.20 | | |
| r26 = 37.803 | d26 = 5.34 | | |
| r27 = −1000.000 | d27 = 3.80 | | |
| r28 = 0.000 | d28 = 29.00 | | |
| r29 = 0.000 | d29 = 11.20 | | |
| r30 = 0.000 | | | |

TABLE 2

| Focal length Variable gap | 7.60 | 15.20 | 29.11 | 86.64 | 111.49 |
|---|---|---|---|---|---|
| d7 | 0.39 | 20.78 | 33.92 | 47.57 | 49.55 |
| d12 | 52.91 | 29.89 | 14.80 | 3.37 | 3.78 |
| d15 | 1.55 | 4.18 | 6.13 | 3.91 | 1.53 |

Figure 10:
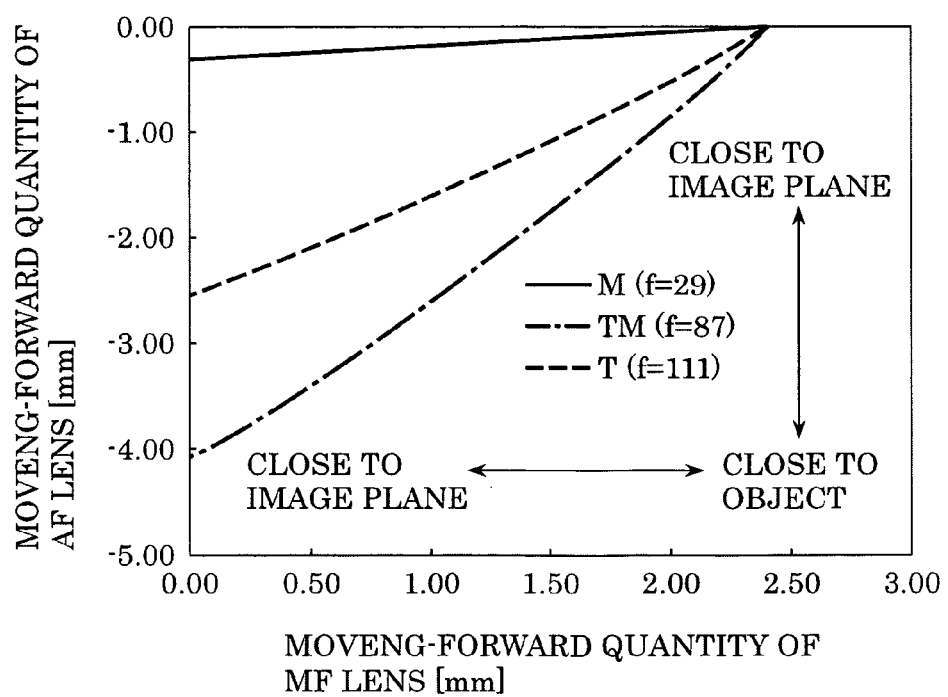
FIG. 10 is a graph illustrating move quantities of an MF and AF lens units in a transitional mode.

Table 3 shows move quantities of the MF lens unit (the front cell lens unit I) and the AF lens unit (the second lens sub-unit BR) of the numerical example in the transitional mode. Under the condition of a constant object distance 2.5 m at the wide angle end and in the respective cases where focal lengths are 29 mm (M), 87 mm (TM), and 111 mm (T), the move quantities (in mm) of the AF lens unit for maintaining the focus state of the lens apparatus against the corresponding move quantities (in mm) of the MF lens unit in the transitional mode are shown. Each numerical value indicates a quantity relative to the reference position of the corresponding focus lens unit, and its positive sign indicates that the focus lens unit moves toward an image plane. FIG. 10 is a graph illustrating the move quantities shown in Table 3.

TABLE 3

| Moving-forward quantity of MF lens unit (mm) | Moving-forward quantity of AF lens unit (mm) | | |
|---|---|---|---|
| | M (f = 29) | TM (f = 87) | T (f = 111) |
| 0.00 | −0.32 | −2.54 | −4.08 |
| 0.20 | −0.29 | −2.36 | −3.81 |
| 0.50 | −0.25 | −2.09 | −3.37 |

TABLE 3-continued

| Moving-forward quantity of MF lens unit (mm) | Moving-forward quantity of AF lens unit (mm) | | |
|---|---|---|---|
| | M (f = 29) | TM (f = 87) | T (f = 111) |
| 1.00 | −0.19 | −1.60 | −2.60 |
| 1.50 | −0.13 | −1.08 | −1.76 |
| 2.00 | −0.06 | −0.51 | −0.83 |
| 2.20 | −0.03 | −0.26 | −0.44 |
| 2.30 | −0.02 | −0.14 | −0.23 |
| 2.41 | 0.00 | 0.00 | 0.00 |

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-132431 filed Apr. 28 , 2004, which is hereby incorporated by reference herein.

What is claimed is:

1. A drive controller of a lens apparatus including a first lens unit moving for performing manual focus and a second lens unit moving for performing auto-focus, comprising:
    a control device switchable between a first mode performing an auto-focus drive control of the second lens unit and a second mode maintaining the second lens unit in an unmovable state at a predetermined position,
    wherein the control device has a third mode controlling drive of the second lens unit so as to maintain a focus state of the lens apparatus upon receiving a command for switching the first mode to the second mode, on the basis of positional information of the first lens unit, and moves to the second mode upon detecting that the second lens unit has reached the predetermined position in the third mode.

2. A drive controller according to claim 1, wherein the control device performs the auto-focus drive control in the first mode, on the basis of focal information indicating a focal state of the lens apparatus, and controls the drive of the second lens unit so as to maintain the focus state of the lens apparatus in the third mode, on the basis of information different from the focal information.

3. A drive controller according to claim 1, wherein the control device performs the auto-focus drive control in the first and third modes, on the basis of focal information indicating a focal state of the lens apparatus.

4. A drive controller according to claim 1, wherein the control device determines a drive target direction of the second lens unit in the third mode and, when the determined direction corresponds to a direction in which the second lens unit moves closer to the predetermined position, drives the second lens unit so as to maintain the focus state of the lens apparatus.

5. A drive controller according to claim 1, wherein the control device determines a drive target direction of the second lens unit in the third mode and, when the determined direction corresponds to a direction in which the second lens unit moves away from the predetermined position, drives the second lens unit to the predetermined position.

6. A drive controller according to claim 1, wherein the control device determines a drive target direction of the second lens unit in the third mode and prohibits the drive of the second lens unit in the determined direction when the second lens unit moves away from the predetermined position in the determined drive target direction.

7. A drive controller according to claim 6, wherein the control device drives the second lens unit to the predetermined position when a halt time period of the second lens in the third mode exceeds a predetermined time period.

8. A drive controller according to claim 1, wherein the control device outputs a display signal for displaying a present mode among the first, second, or third modes.

9. Computer-executable process steps for implementing the function of the drive controller according to claim 1.

10. A drive controller of a lens apparatus including a first lens unit moving for performing manual focus and a second lens unit moving for performing auto-focus, comprising:
a control device switchable between a first mode performing an auto-focus drive control of the second lens unit and a second mode maintaining the second lens unit in an unmovable state at a predetermined position,
wherein the control device has a third mode performing the focus drive control until detecting that the second lens unit has reached the predetermined position, and in the third mode, upon receiving a command for switching the first mode to the second mode, moves to the second mode in response to detecting that the second lens unit has reached the predetermined position.

11. A drive controller according to claim 10, wherein the control device determines a drive target direction of the second lens unit in the third mode and drives the second lens unit with the auto-focus drive control when the determined direction corresponds to a direction in which the second lens unit moves closer to the predetermined position.

12. A drive controller according to claim 10, wherein the control device determines a drive target direction of the second lens unit in the third mode and drives the second lens unit to the predetermined position when the determined direction corresponds to a direction in which the second lens unit moves away from the predetermined position.

13. A drive controller according to claim 10, wherein the control device determines a drive target direction of the second lens unit in the third mode and prohibits the drive of the second lens unit in the determined direction when the second lens unit moves away from the predetermined position in the determined drive target direction.

14. A drive controller according to claim 13, wherein the control device drives the second lens unit to the predetermined position when a halt time period of the second lens in the third mode exceeds a predetermined time period.

15. A drive controller according to claim 10, wherein the control device outputs a display signal for displaying a present mode among the first, second, or third modes.

16. Computer-executable process steps for implementing the function of the driver controller according to claim 10.

17. A lens system comprising:
a lens apparatus including a first lens unit moving for performing manual focus and a second lens unit moving for performing auto-focus; and
a drive controller comprising a control device switchable between a first mode performing an auto-focus drive control of the second lens unit and a second mode maintaining the second lens unit in an unmovable state at a predetermined position, wherein the control device has a third mode controlling drive of the second lens unit so as to maintain a focus state of the lens apparatus upon receiving a command for switching the first mode to the second mode, on the basis of positional information of the first lens unit, and moves to the second mode upon detecting that the second lens unit has reached the predetermined position in the third mode.

18. A lens system according to claim 17, wherein the control device determines a drive target direction of the second lens unit in the third mode and, when the determined direction corresponds to a direction in which the second lens unit moves closer to the predetermined position, drives the second lens unit so as to maintain the focus state of the lens apparatus.

19. A lens system according to claim 17, wherein the control device determines a drive target direction of the second lens unit in the third mode and, when the determined direction corresponds to a direction in which the second lens unit moves away from the predetermined position, drives the second lens unit to the predetermined position.

20. A lens system according to claim 17, wherein the control device determines a drive target direction of the second lens unit in the third mode and prohibits the drive of the second lens unit in the determined direction when the second lens unit moves away from the predetermined position in the determined drive target direction, and wherein the control device drives the second lens unit to the predetermined position when a halt time period of the second lens in the third mode exceeds a predetermined time period.

21. A lens system comprising:
a lens apparatus including a first lens unit moving for performing manual focus and a second lens unit moving for performing auto-focus; and
a drive controller comprising a control device switchable between a first mode performing an auto-focus drive control of the second lens unit and a second mode maintaining the second lens unit in an unmovable state at a predetermined position, wherein the control device has a third mode performing the focus drive control until detecting that the second lens unit has reached the predetermined position, and in the third mode, upon receiving a command for switching the first mode to the second mode, moves to the second mode in response to detecting that the second lens unit has reached the predetermined position.

22. A lens system according to claim 21, wherein the control device determines a drive target direction of the second lens unit in the third mode and drives the second lens unit with the auto-focus drive control when the determined direction corresponds to a direction in which the second lens unit moves closer to the predetermined position.

23. A lens system according to claim 21, wherein the control device determines a drive target direction of the second lens unit in the third mode and drives the second lens unit to the predetermined position when the determined direction corresponds to a direction in which the second lens unit moves away from the predetermined position.

24. A lens system according to claim 21, wherein the control device determines a drive target direction of the second lens unit in the third mode and prohibits the drive of the second lens unit in the determined direction when the second lens unit moves away from the predetermined position in the determined drive target direction, and wherein the control device drives the second lens unit to the predetermined position when a halt time period of the second lens in the third mode exceeds a predetermined time period.

25. A lens apparatus comprising:
a first lens unit moving for performing manual focus;
a second lens unit moving for performing auto-focus; and a drive controller comprising a control device switchable between a first mode performing an auto-focus drive control of the second lens unit and a second mode maintaining the second lens unit in an unmovable state at a predetermined position, wherein the control device had a third mode controlling drive of the second lens unit so as to maintain a focus state of the lens apparatus upon receiving a command for switching the first mode to the second mode, on the basis of positional information of the first lens unit, and moves to the second mode upon detecting that the second lens unit has reached the predetermined position in the third mode.

26. A lens apparatus according to claim 25, wherein the control device determines a drive target direction of the second lens unit in the third mode and, when the determined direction corresponds to a direction in which the second lens unit moves closer to the predetermined position, drives the second lens unit so as to maintain the focus state of the lens apparatus.

27. A lens apparatus according to claim 25, wherein the control device determines a drive target direction of the second lens unit in the third mode and, when the determined direction corresponds to a direction in which the second lens unit moves away from the predetermined position, drives the second lens unit to the predetermined position.

28. A lens apparatus according to claim 25, wherein the control device determines a drive target direction of the second lens unit in the third mode and prohibits the drive of the second lens unit in the determined direction when the second lens unit moves away from the predetermined position in the determined drive target direction, and wherein the control device drives the second lens unit to the predetermined position when a halt time period of the second lens in the third mode exceeds a predetermined time period.

29. A lens apparatus comprising:
a first lens unit moving for performing manual focus;
a second lens unit moving for performing auto-focus; and
a drive controller comprising a control device switchable between a first mode performing an auto-focus drive control of the second lens unit and a second mode maintaining the second lens unit in an unmovable state at a predetermined position, wherein the control device has a third mode performing the focus drive control until detecting that the second lens unit has reached the predetermined position, and in the third mode, upon receiving a command for switching the first mode to the second mode, moves to the second mode in response to detecting that the second lens unit has reached the predetermined position.

30. A lens apparatus according to claim 29, wherein the control device determines a drive target direction of the second lens unit in the third mode and drives the second lens unit with the auto-focus drive control when the determined direction corresponds to a direction in which the second lens unit moves closer to the predetermined position.

31. A lens apparatus according to claim 29, wherein the control device determines a drive target direction of the second lens unit in the third mode and drives the second lens unit to the predetermined position when the determined direction corresponds to a direction in which the second lens unit moves away from the predetermined position.

32. A lens apparatus according to claim 29, wherein the control device determines a drive target direction of the second lens unit in the third mode and prohibits the drive of the second lens unit in the determined direction when the second lens unit moves away from the predetermined position in the determined drive target direction, and wherein the control device drives the second lens unit to the predetermined position when a halt time period of the second lens in the third mode exceeds a predetermined time period.

33. A photographic system comprising:
the lens system according to claim 17; and
a photographic apparatus having the lens apparatus mounted thereon.

34. A photographic system, comprising:
the lens apparatus according to claim 25; and
a photographic apparatus having the lens apparatus mounted thereon.

* * * * *